May 15, 1945.  S. JOHNSON ET AL  2,375,925
AIRCRAFT STRUCTURE
Filed Nov. 11, 1942
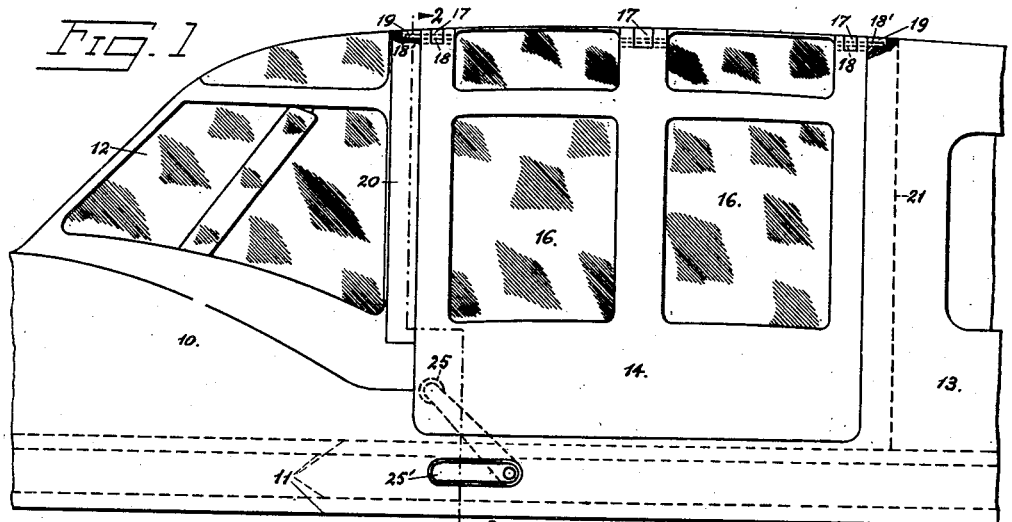
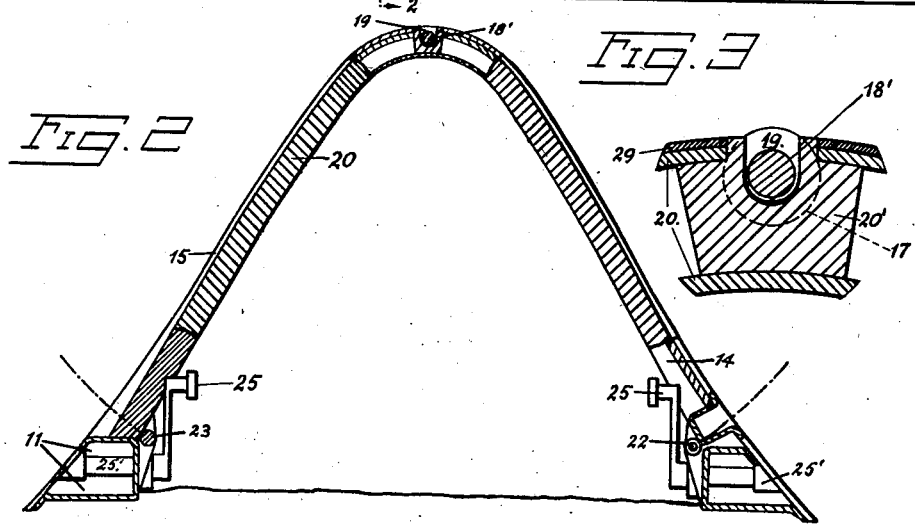
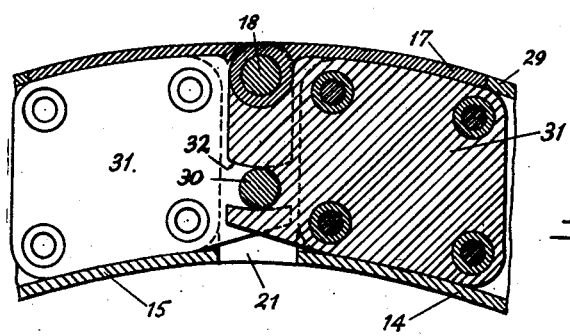
INVENTORS:
SETH JOHNSON,
EDOUARD SCHENK;
BY: Robert C. Rasche
ATTORNEY.

Patented May 15, 1945

2,375,925

UNITED STATES PATENT OFFICE 2,375,925

AIRCRAFT STRUCTURE

Seth Johnson, Farmingdale, and Edouard Schenk, New York, N. Y., assignors to Republic Aviation Corporation, a corporation of Delaware Application November 11, 1942, Serial No. 465,252

7 Claims. (Cl. 244—121)

This invention relates to cockpit enclosures for aircraft, more especially for single-seater aircraft of the pursuit-interceptor type, and this application is a continuation-in-part of the application Serial Number 465,251 of Seth Johnson, "Aircraft structure," filed concurrently herewith.

The cockpit enclosure of said application, while highly desirable and effective, involves certain complexities of structure which might render the large-scale manufacture of such structure difficult to achieve within the extremely short periods of time allowed for the fabrication of a canopy by quantity-production systems of manufacture.

It is one of the objects of this invention to provide a somewhat simplified embodiment of the principles disclosed in said application, so modified as to be eminently well-adapted to multiple-scale or ultra-large scale production of cockpit enclosures and yet incorporate the novel advantages and functions of the previous enclosure.

The specific objects, as well as advantages and specific results, of the invention will be manifested as the specific disclosure proceeds.

Two embodiments of the concepts of the present invention are particularized hereinafter in connection with the accompanying drawing, but it is to be understood that the concepts of this invention are limited in their embodiment only by the scope of the sub-joined claims. In this drawing, Figure 1 is a partial side elevation of an aircraft fuselage and canopy provided with the first embodiment of the invention;

Figure 2 is a section along line 2—2 of Figure 1;

Figure 3 is a detail of Figure 2 shown on a scale enlargement; and

Figure 4 is a detail view, similar to Figure 3, of another embodiment.

Briefly stated, one embodiment of the invention includes a releasable swivel connection consisting of a pair of opposed movable retaining pins formed by projections of the hinge pin and normally resting in corresponding U-shaped recesses formed in fixed blocks inserted in the apices of the arches of, respectively, the windshield and the turtle-back cover.

Another embodiment of the invention includes a swivel connection, releasable in an emergency, consisting of a pair of opposed, fixed, retaining pins projecting from the apices of the arches of, respectively, the windshield and the turtle-back cover and normally working in corresponding open, curved recesses formed in the frame of each half of the cockpit closure under the hinge, concentrically about the axis of said hinge.

Referring now to the drawing and first to Figures 1, 2 and 3, there is shown a portion of an aircraft fuselage generally designated by the numerals 10, and 11 indicates the upper longerons of said fuselage.

A fixed canopy, including a front transparent windshield 12 and a rear turtle-back cover 13, forms a streamline upward projection of said fuselage above said longerons. Access to the cockpit is provided by a cockpit closure or hatch fitting into the opening between the windshield and the turtle-back cover, and both swingable and jettisonable.

This closure comprises a left-hand door having a frame 14, and a right-hand door having a symmetrical frame 15, both doors being provided with transparent panels 16. These frames 14 and 15 are hinged together along their upper edges by means of three horizontal hinges 17. The pins 18 of the two extreme hinges have extensions 18' projecting in opposite directions within the windshield and within the turtle-back cover, respectively. These projections 18' act as retaining pins in cooperation with U-shaped recesses 19 provided in blocks 20' (Figure 3) inserted in the apices of the arches 20, 21 of the windshield and of the turtle-back cover, respectively, thereby establishing a swivel connection between each frame 14, 15 and the fixed part of the canopy.

Along their lower edges, these frames 14, 15 carry a series of sockets 22, cooperating with a pair of latching members 23, carried by the longerons 11, and actuated by means of either an inner handle 25 or an outer handle 25', normally collapsed within a longeron 11 and a cutout of the fuselage skin.

Figure 3 discloses one of the blocks 20', filling the apex of the windshield arch 20, and inserted in a cutout provided in the skin 29 of the windshield 12 and in the top wall of the frame or arch 20.

In the second embodiment (Figure 4), the swivel connection between the cockpit closure 14, 15 and the fixed part of the canopy 12, 13 is established by means of two opposed, fixed, retaining-pins 30 projecting from the apices of the arches 20, 21 into recessed blocks 31 mounted in the doors 14, 15 under the two extreme hinges 17. Normally, each of said retaining pins rests snugly in an opposed pair of open, overlapping slots 32, forming the recesses in said blocks 31 and concentrically curved about the axis of the hinge pins 18.

When one of the doors 14, 15 is unlatched from the corresponding longeron 11 by turning either handles 25 or 25' and is then swung open, one pair only of said blocks 31 is swung beyond the pins 30 and the swivel connection is maintained by the active cooperation of the pins 30 with the recesses of the opposite pair of forks 31, carried by the still closed and latched opposite door of the cockpit closure. When both doors 14, 15 are simultaneously unlatched and swung open, the lower prongs or sides of the recesses of all the four blocks 31 are simultaneously swung in opposite directions on either side of the pins 30, thus releasing the last mechanical connection left between the removable cockpit closure and the fixed part of the canopy when the doors 14, 15 reach a substantially horizontal position.

It is to be noted that, in this embodiment, the cockpit closure is not immediately released upon the unlatching of the sockets 22, as the swivel connection 30, 31 subsists until the doors 14, 15 have described about the axis of the hinge 17, an angle determined by the length of the retaining prongs of the blocks 31, i. e., have reached a substantially horizontal position above the pilot's head. Under certain conditions such as strong side winds, this delay is very useful in a jettisoning operation, by preventing the lower edge or lower corner of one of the doors 14, 15 from striking the pilot's head.

Having thus disclosed the invention and several embodiments thereof, what is claimed is:

1. In an airplane: a fuselage; a fixed canopy on said fuselage; cockpit doors hinged together at their peak, a releasable connection between the hinged edges of said doors and the peak of said fixed canopy, said connection comprising opposed laterally open bearings, each bearing being formed in the peak of one of said doors; and retaining pins fixedly mounted on said canopy and projecting inwardly from said canopy into said bearings.

2. An aircraft canopy having a stationary part and two swingable cockpit doors hinged together, in combination with, releasable holding means to maintain the hinge of said doors attached to said stationary part so long as at least one of said doors is closed comprising pins and corresponding open bearings to seat said pins, said bearings being oriented with respect to said hinge so as to release automatically said attachment when both of said doors are simultaneously opened and lifted.

3. An aircraft canopy having a stationary part and two swingable cockpit doors hinged together, in combination with releasable holding means to maintain the hinge of said doors attached to said stationary part so long as at least one of said doors is closed, comprising a projection at each end of the hinge connecting said doors, and a block fixed to the stationary part of the canopy adjoining each end of said hinge and having a U-shaped bearing slot in its outer face in alignment with the hinge aforesaid to releasably receive said projection, the openings to said bearings being free and open at all times.

4. In an aircraft canopy a stationary part, a pair of swingable doors with their adjoining edges hinged one to the other, each hinged edge of the doors having a recess therein adjacent to each end thereof, and pins projecting from the stationary part of the canopy near the ends of said hinge to be received in one or both of the adjacent recesses upon the closing of said doors.

5. In an aircraft canopy having a stationary part and two swingable cockpit doors hinged together the combination with releasable holding means to maintain the top of said doors attached to said stationary part as long as both of said doors are not completely open, said holding means comprising a pair of retaining pins carried by said stationary part and projecting into said doors, and a corresponding pair of C-shaped bearing seats formed in said doors so as to be confined by said pins laterally and downwardly and released therefrom upwardly only when both doors are simultaneously opened and reach a substantially horizontal position.

6. In an aircraft canopy having a stationary part and two swingable cockpit doors hinged together: releasable holding means to maintain the top of said doors attached to said stationary part as long as both of said doors are not completely open, said holding means comprising a pair of opposed, aligned retaining pins carried by said stationary part and projecting into said doors, and corresponding pairs of recessed blocks carried by said doors under each end of the hinge thereof, defining opposed recesses to receive and release said pins, only when both doors are simultaneously opened and reach a substantially horizontal position.

7. In an aircraft canopy having a stationary part and two swingable cockpit doors hinged together: releasable holding means to maintain the top of said doors attached to said stationary part as long as both of said doors are not completely open, said holding means comprising a pair of longitudinally aligned retaining pins fixedly mounted on said stationary part and projecting inwardly therefrom below the hinge between the doors, and two corresponding pairs of transversely opposed arcuate prongs carried by said doors and normally engaged under said pins so as to retain the top of said doors attached to said stationary part; the active face of each of said prongs being curved concentrically around the axis of said hinge and the arc of said face being such that the corresponding door must swing about its hinge until it reaches a substantially horizontal position before said face becomes disengaged from under the corresponding pin.

SETH JOHNSON.
EDOUARD SCHENK.